(12) United States Patent
Oleson et al.

(10) Patent No.: US 11,219,270 B2
(45) Date of Patent: Jan. 11, 2022

(54) DUAL-LAYERED MIDSOLE

(71) Applicant: LULULEMON ATHLETICA CANADA INC., Vancouver (CA)

(72) Inventors: Mark Arthur Oleson, Portland, OR (US); Michael Andrew Notrica, Portland, OR (US); Christopher Ka-Yin Lam, Portland, OR (US); Michael Steszyn, Portland, OR (US); Peter Andrew Hudson, Bend, OR (US)

(73) Assignee: LULULEMON ATHLETICA CANADA INC., Vancouver (CA)

( * ) Notice: Subject to any disclaimer, the term of this patent is extended or adjusted under 35 U.S.C. 154(b) by 0 days.

(21) Appl. No.: 17/178,119

(22) Filed: Feb. 17, 2021

(65) Prior Publication Data

US 2021/0169173 A1 Jun. 10, 2021

Related U.S. Application Data

(63) Continuation of application No. PCT/CA2020/051185, filed on Aug. 28, 2020.

(60) Provisional application No. 62/894,655, filed on Aug. 30, 2019.

(51) Int. Cl.
*A43B 13/12* (2006.01)
*A43B 13/18* (2006.01)
*A43B 13/14* (2006.01)

(52) U.S. Cl.
CPC .......... *A43B 13/181* (2013.01); *A43B 13/125* (2013.01); *A43B 13/127* (2013.01); *A43B 13/143* (2013.01)

(58) Field of Classification Search
CPC ..... A43B 13/12; A43B 13/125; A43B 13/127; A43B 13/023
USPC ......................................................... 36/30 R
See application file for complete search history.

(56) References Cited

U.S. PATENT DOCUMENTS

| 5,575,089 | A  | * | 11/1996 | Giese  | A43B 13/12 36/28 |
| 6,205,683 | B1 | * | 3/2001  | Clark  | A43B 13/12 36/102 |
| 6,684,532 | B2 | * | 2/2004  | Greene | A43B 7/141 36/144 |
| 7,010,867 | B2 | * | 3/2006  | Brown  | A43B 7/12 36/12 |

(Continued)

OTHER PUBLICATIONS

Canadian Intellectual Property Office, International Search Report and Written Opinion of the International Searching Authority, dated Nov. 26, 2020, in PCT/CA2020/051213, which is the international application to which this U.S. application claims priority.

*Primary Examiner* — Marie D Bays
(74) *Attorney, Agent, or Firm* — Kolitch Romano LLP

(57) ABSTRACT

A dual-layered midsole for footwear includes an internal midsole layer and an external midsole layer, which are coupled to and separated by a Strobel board. The internal midsole layer may compress and expand with the movement of a wearer of an article of footwear including the dual-layered midsole, while the external midsole may provide stability and cushion for the wearer. Materials selected for the internal and external midsole layers may provide tuned viscoelastic properties to different areas of the midsole as a function of midsole layer thickness at each sole area.

14 Claims, 11 Drawing Sheets

(56) References Cited

U.S. PATENT DOCUMENTS

| | | | | |
|---|---|---|---|---|
| 7,127,833 B2* | 10/2006 | Haimerl | ................. | A43B 7/125 36/14 |
| 7,197,840 B2* | 4/2007 | Nakano | ................. | A43B 7/144 12/142 B |
| 7,743,530 B2* | 6/2010 | Truelsen | ................. | A43D 3/026 36/30 R |
| 9,468,258 B2* | 10/2016 | Ruiz | .................... | A43B 23/025 |
| 2003/0079373 A1* | 5/2003 | Geer | .................... | A43B 1/0081 36/3 B |
| 2003/0093920 A1* | 5/2003 | Greene | ................. | A43B 7/141 36/25 R |
| 2005/0022425 A1* | 2/2005 | Brown | ................. | A43B 13/12 36/30 R |
| 2006/0075658 A1* | 4/2006 | Mitchell | ................ | A43B 13/40 36/28 |
| 2007/0186446 A1* | 8/2007 | Lafortune | .............. | A43B 13/40 36/43 |
| 2010/0146819 A1* | 6/2010 | Teteriatnikov | ....... | A43B 13/145 36/103 |
| 2010/0275471 A1* | 11/2010 | Teteriatnikov | ....... | A43B 13/145 36/30 R |
| 2011/0061264 A1* | 3/2011 | Solymosi | ............... | A43B 7/142 36/88 |
| 2016/0302517 A1 | 10/2016 | Jessiman et al. | | |
| 2019/0328083 A1 | 10/2019 | Malinowski et al. | | |
| 2020/0305543 A1* | 10/2020 | Kajiwara | ............. | A43B 13/183 |

\* cited by examiner

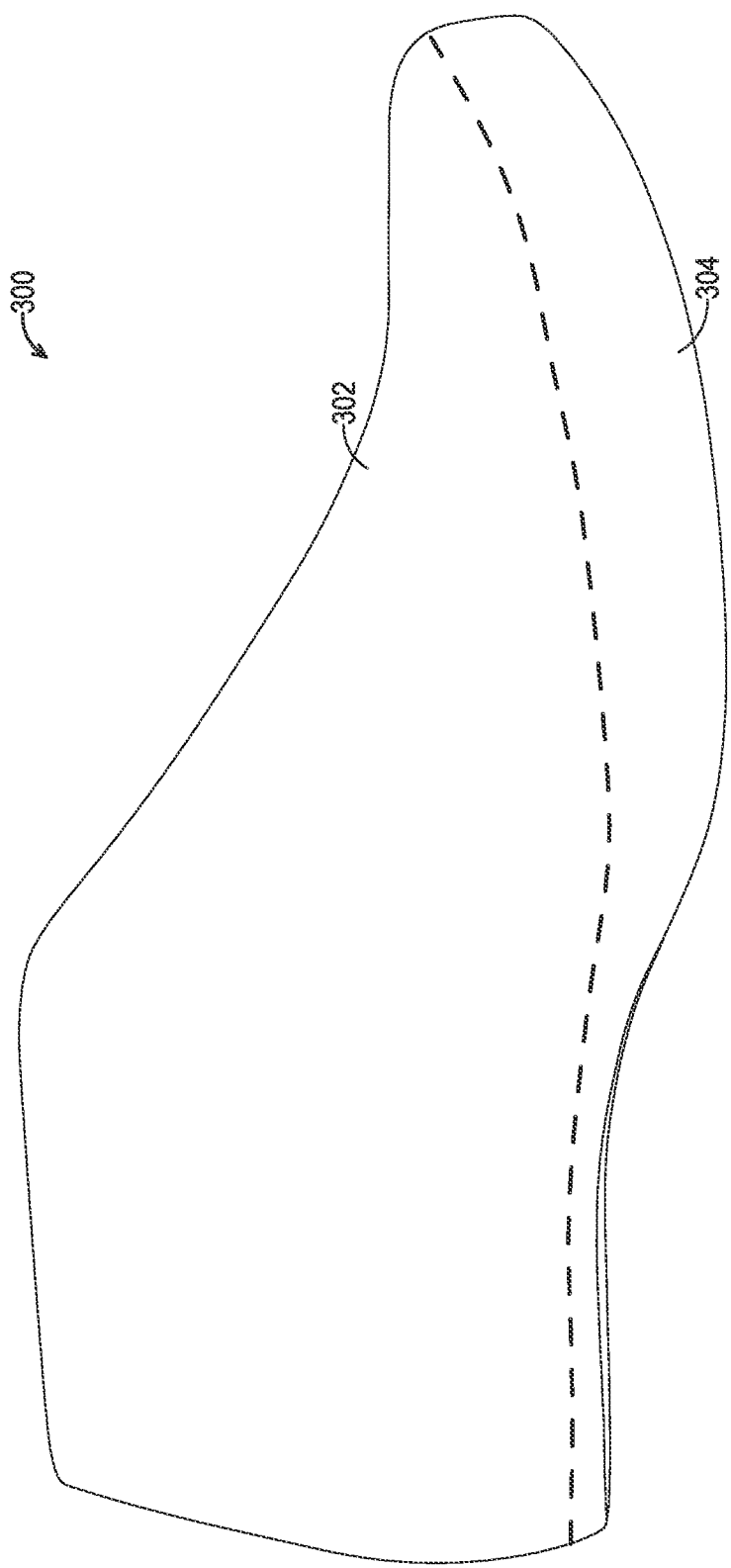

DUAL-LAYERED MIDSOLE

CROSS-REFERENCES

The following application is incorporated herein, in its entirety, for all purposes: U.S. Provisional Patent Application Ser. No. 62/894,655, filed Aug. 30, 2019.

FIELD

This disclosure relates to systems and methods for footwear. More specifically, the disclosed embodiments relate to midsoles for articles of footwear.

INTRODUCTION

As the human foot moves through various positions associated with a normal running and walking motion, the shape of different regions of the foot shifts. When a runner or walker's weight is concentrated on their forefoot, volume of the forefoot area increases. It is advantageous for a wearer to have access to shoes which closely mimic the shape and size of the human foot at all stages of movement. Shoes which do not easily change shape can lead to compression or rubbing within the forefoot region. This can lead to blistering or other sources of discomfort. There is a need for a shoe which includes a foot compartment, or sock, which adapts to changing foot shapes and positions for increased wearer comfort.

SUMMARY

The present disclosure provides systems, apparatuses, and methods relating to improved footwear.

In some embodiments, an article of footwear includes: a sole including: a first midsole layer extending from a forefoot region to a heel region of the sole; a second midsole layer disposed below the first midsole layer; and a Strobel board disposed between the first and the second midsole layers.

In some embodiments, an article of footwear includes: a Strobel board; and a sole including a first midsole layer extending from a forefoot region to a heel region of the sole and coupled to a top surface of the Strobel board, and a second midsole layer coupled to a bottom surface of the Strobel board.

In some embodiments, a method of manufacturing a dual-layered midsole includes: coupling a first midsole layer to a bottom surface of a Strobel board; and coupling a second midsole layer to a top surface of the Strobel board.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 11 is an illustrative last for use in the illustrative method of FIG. 10.

DETAILED DESCRIPTION

Figure 1:
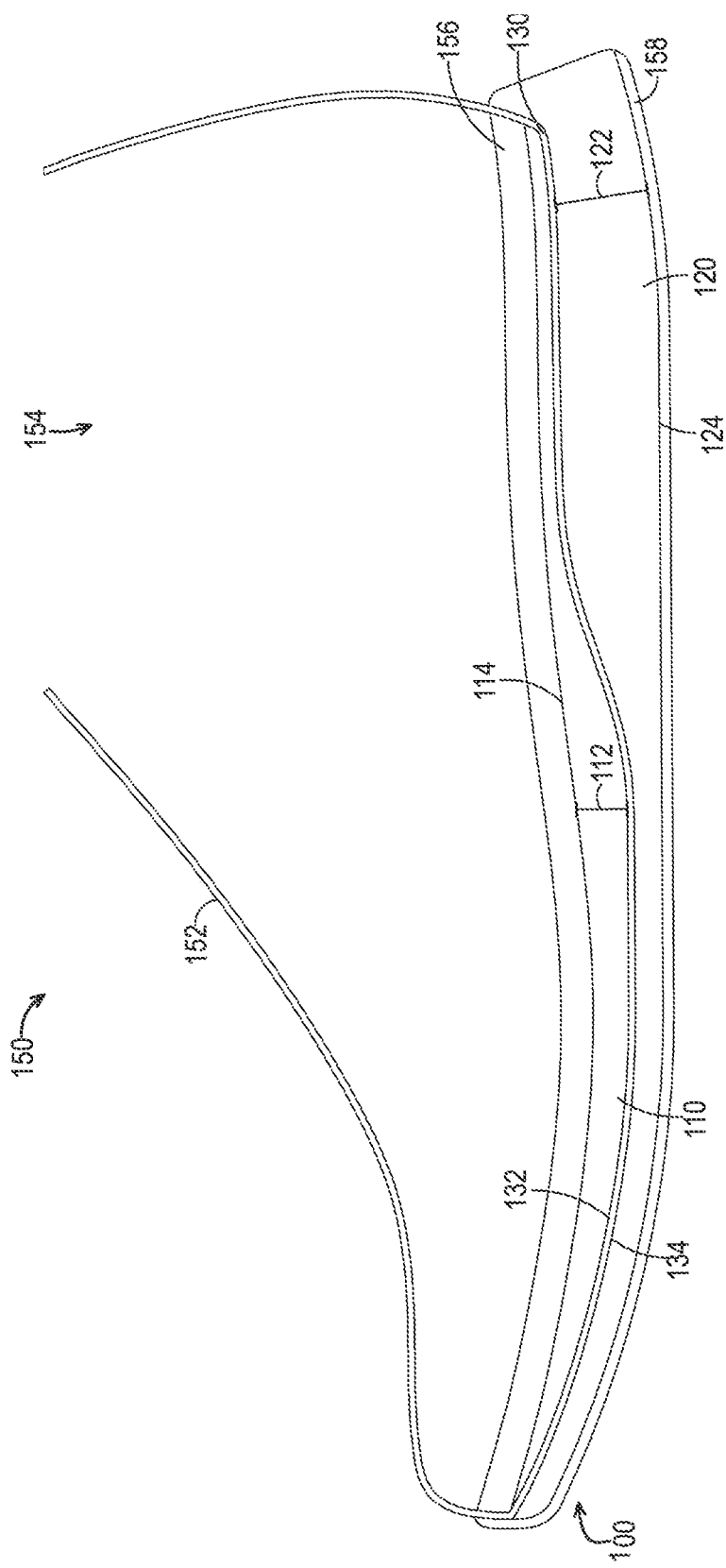
FIG. 1 is a schematic diagram of an illustrative shoe including a first illustrative dual-layered midsole.

Various aspects and examples of dual-layered midsoles for footwear, as well as related methods, are described below and illustrated in the associated drawings. Unless otherwise specified, a midsole in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "medial," "lateral," "anterior," "posterior," and the like are intended to refer to anatomical directions corresponding to a human on whom the article or object is configured to be placed or worn. For example, "medial" refers to a relative position disposed toward the center of the human body, while "lateral" refers to a relative position disposed away from the center of the human body. With respect to footwear, the term "anterior" refers to a relative position closer to the toe of a wearer and "posterior" refers to a relative position closer to the heel of the wearer. In the absence of a wearer, the same directional terms may be used as if the article of footwear is being worn in its expected configuration.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

"EVA" refers to ethylene-vinyl acetate.

"TPU" refers to thermoplastic polyurethane.

"PU" refers to polyurethane.

"TPE" refers to thermoplastic elastomer.

"PEBA" refers to polyether block amide.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a dual-layered midsole according to the present teachings includes an internal midsole layer and an external midsole layer, which are separated from each other by a Strobel board. This construction results in the internal midsole layer being contained within a "sock" of the shoe, the sock including an upper coupled to the Strobel board. The internal midsole layer is thereby adaptable to movement of a user's foot, allowing for the interior volume of the sock to change shape as the foot changes shape. A shoe including the dual-layered midsole may include a variety of layers disposed between a foot of the wearer and an underlying support surface (e.g., the ground). These layers may include, but are not limited to, a sockliner, an internal midsole layer, a Strobel board, an external midsole layer, a plate, an outsole, and/or any other layers suitable for inclusion within a sole or sock.

These layers may be selectively included and coupled or uncoupled to one another to tune various properties of the shoe. In some examples, layers of the sole closer to the foot may be uncoupled, loosely coupled, or tacked, such that they "float" within the sock of the shoe. The sockliner may be completely free within the sock of the shoe, facilitating removal and/or replacement. The internal midsole may be loosely tacked or coupled to the Strobel board, or may be completely free within the sock of the shoe. The internal midsole may further include a plate, e.g., formed as an integral component of the internal midsole. Layers disposed farther away from the foot of the wearer may be glued or otherwise bonded to other layers.

The Strobel board may be glued, sewn, or otherwise bonded to the upper of the shoe, forming the sock. The Strobel board may be bonded on parts of a lower surface to the external midsole of the shoe. In some examples, the Strobel board is bonded to the external midsole only at forefoot regions of the shoe. In some examples, the Strobel board is bonded to the external midsole only at heel regions of the shoe. In some embodiments, the Strobel board is bonded at parts to the outsole, as the external midsole may not extend the entire length of the shoe.

The external midsole may be bonded at selected locations to an outsole disposed beneath the external midsole. In some examples, the external midsole further includes a plate, e.g., formed as an integral component of the external midsole. In some examples, the external midsole is bonded to a plate disposed between the external midsole and the outsole. In some examples, the external midsole is bonded to a plate disposed between the external midsole and the Strobel board. In some examples, the external midsole includes siping or the like configured to provide a tread pattern on parts of the external midsole, such that parts of the external midsole function as a ground-contacting surface of the shoe. In some examples, the outsole covers an entire bottom surface of the external midsole and may function as a ground-contacting surface of the shoe.

Internal and external midsole layers may comprise foams, polymers, and/or other synthetic materials configured to provide specific energy absorbing and energy returning properties based on the area(s) of the foot supported by each midsole layer. In some examples, the external midsole is disposed in a heel region of the shoe, i.e., generally beneath the heel of a wearer, and is configured to absorb impact associated with a striking of the heel on an underlying surface, such as when running or walking. The external midsole layer may comprise foams selected to have tailored viscoelastic properties such as a high damping coefficient and/or low spring coefficient, and to produce a slow response. Materials selected for the external midsole may include EVA, PU, and/or any other materials having the above-described properties. In some examples, the external midsole comprises energy returning foams such as EVA, PU, PEBA, PEBAX, Mucell, and/or any other suitable material having a high spring coefficient and a low damping coefficient.

The internal midsole may be disposed in a forefoot region of the shoe, i.e., generally beneath the forefoot of a wearer, and may be configured to support the foot of a wearer during take-off/toe-off. The internal midsole layer may comprise foams selected to have energy-returning properties, such as a high spring coefficient and a low damping coefficient. Materials selected for the external midsole may include EVA, PU, PEBA, PEBAX, Mucell, and/or any other materials including the above-described properties. The internal midsole may be further configured to change volume as the foot of a wearer moves within the shoe. The internal midsole may have a tailored elasticity selected to allow the forefoot area of the shoe to expand as foot volume shifts forward during a normal walking or running motion. In some examples, the internal midsole may comprise energy absorbing foams such as EVA, PU, and/or any other materials including a high damping coefficient and a low spring coefficient.

In some examples, the internal midsole includes a rigid or flexible plate coupled to a bottom surface of the internal midsole. The plate may be included as an integral part of the internal midsole, e.g., within a recess, causing the plate to be flush with a surface of the midsole. The plate may comprise nylon, carbon fiber, and/or any suitable materials selected to provide a desired level of flexibility within the shoe. The plate may extend along the length of the forefoot of the shoe, may extend from the forefoot of the shoe through the arch, and/or may include any suitable length selected to provide a desired level of support to a wearer of the shoe.

The internal and external midsole may partially or completely cover upper and lower sides of (e.g., surround) a Strobel board. This position of the Strobel board at a lower layer of the shoe when compared with conventional shoe construction results in a greater level of control over the spring coefficient of the shoe. The Strobel board is glued, sewn, molded into, and/or otherwise attached to the upper of the shoe. The Strobel board may include foam materials or rigid materials. Materials selected for the Strobel board may be less elastic than materials selected for the midsole.

A method for manufacturing a shoe including a dual-layered midsole according to the present disclosure may include: forming an external midsole according to the current disclosure, forming an internal midsole according to the present disclosure, providing a Strobel board according to the current disclosure, providing a last having a volume equal to the sum of the volume of the human foot and the volume of the internal midsole, providing an upper, lasting the upper, bonding the external midsole to the Strobel board, and bonding the internal midsole to a top surface of the Strobel board. The method may optionally further include bonding an outsole to ground-contacting surfaces or parts of ground-contacting surfaces of the midsole and/or cutting sipes within a heel (and/or other) region of the shoe.

EXAMPLES, COMPONENTS, AND ALTERNATIVES

The following sections describe selected aspects of illustrative dual-layered midsoles as well as related systems and/or methods. The examples in these sections are intended for illustration and should not be interpreted as limiting the scope of the present disclosure. Each section may include one or more distinct embodiments or examples, and/or contextual or related information, function, and/or structure.

A. First Illustrative Midsole

Figure 2:
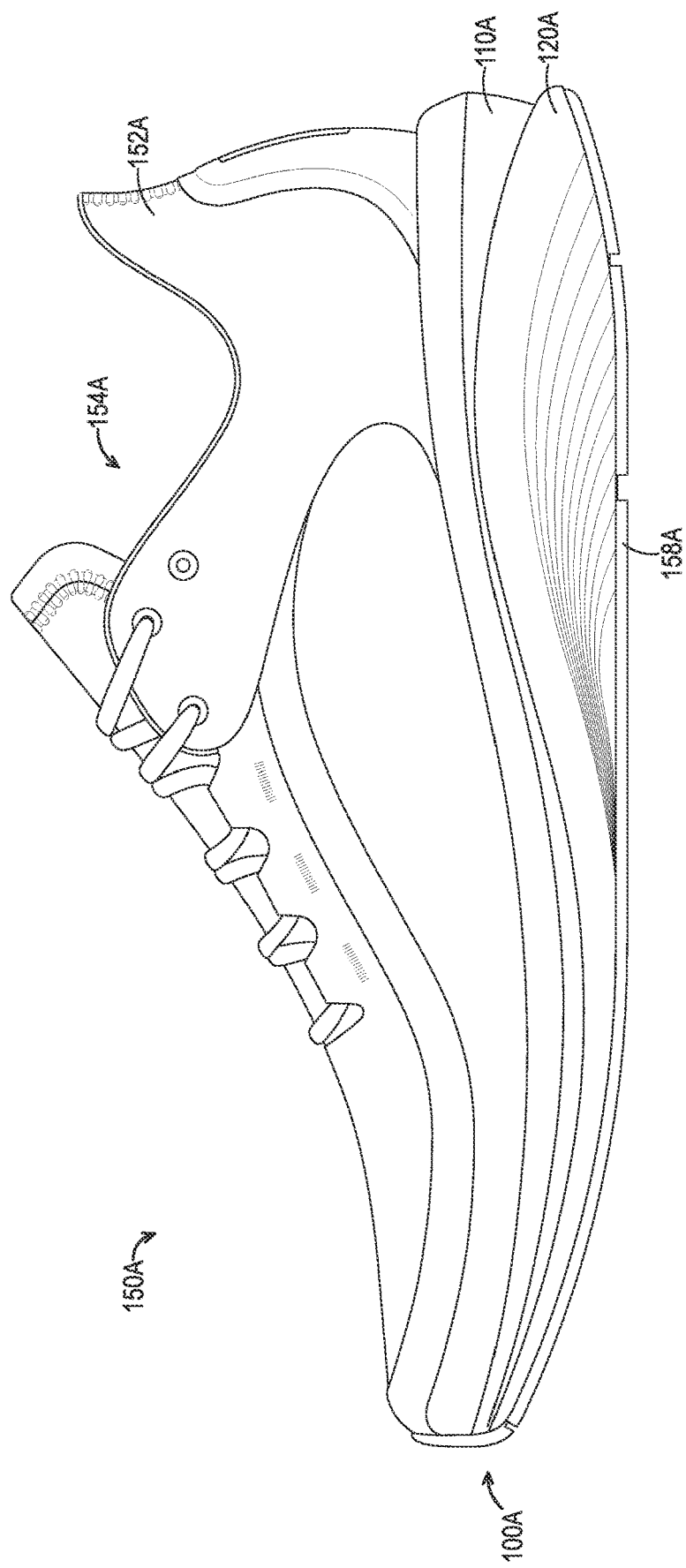
FIG. 2 is a side view of a first shoe including the midsole of FIG. 1.
Figure 3:
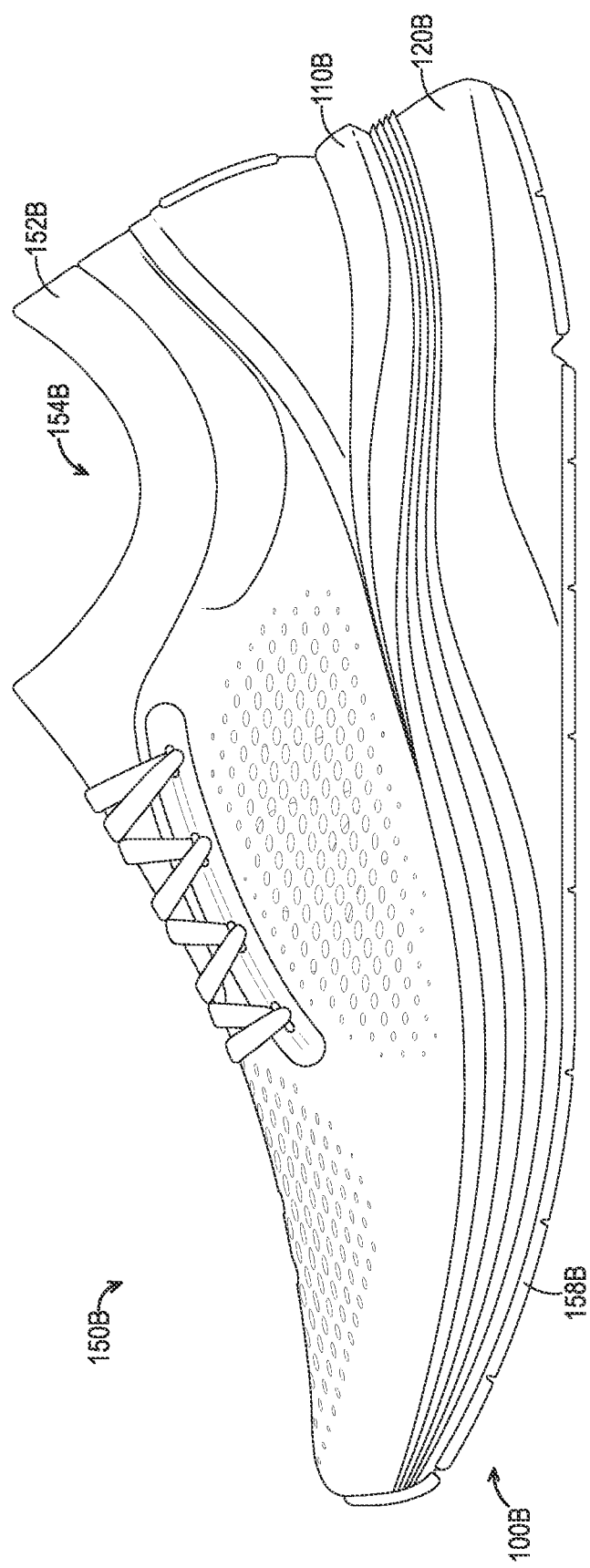
FIG. 3 is a side view of a second shoe including the midsole of FIG. 1.
Figure 4:
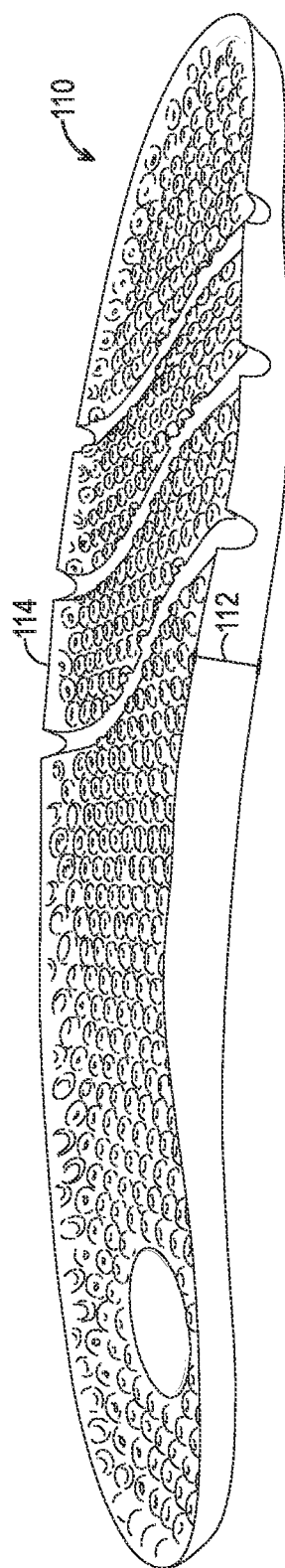
FIG. 4 is an isometric view of an illustrative interior insole layer for inclusion within the first illustrative midsole of FIG. 1.

As shown in FIGS. 1-5, this section describes a first illustrative dual-layered midsole 100, which is an example of the midsoles described in the Overview above. Midsole 100 includes an internal midsole layer (AKA first midsole layer) 110 and an external midsole layer (AKA second midsole layer) 120, which are coupled to and separated by a Strobel board 130. Midsole 100 is configured to be included in a shoe or other article of footwear 150. FIGS. 2-3 depict side views of exemplary shoes 150A and 150B including dual-layered midsoles 100A and 100B, which are substantially identical to midsole 100. The shoe includes an upper 152 (152A, 152B), which may be attached at lower edges to Strobel board 130 of the midsole by any suitable method for coupling flexible components, such as bonding, sewing, and/or the like. Upper 152 and Strobel board 130 collectively define a foot compartment, or "sock" 154 (154A, 154B), which is configured to contain the foot of a wearer. Internal midsole layer 110 (110A, 110B) is disposed within the sock, and may be removably coupled to a top surface 132 of the Strobel board (e.g. with adhesive), so as to be easily replaced or removed. External midsole 120 (120A, 120B) is bonded or otherwise coupled to a bottom surface 134 of the Strobel board using any suitable method for permanently coupling two components, such as mechanical bonding methods, chemical bonding methods (e.g. adhesive), and/or the like. External midsole 120 (120A, 120B) is bonded or otherwise coupled to Strobel board 130, e.g., along the entire length of the Strobel board or at parts of the Strobel board. Strobel board 130 may comprise any suitable flexible material, such as fabric, polymer (e.g., EVA, nylon, etc.), fiberboard, and/or the like.

An internal midsole thickness 112 and an external midsole thickness 122 may each vary along the length of the midsole. In the present example, internal midsole thickness 112 is greatest in a forefoot region (See FIG. 4), and external midsole thickness 122 is greatest in a heel region. Internal and external midsole materials may be selected to provide material properties specific to the desired function of the internal and external midsole, such as spring coefficient, damping coefficient, and/or any other desired viscoelastic properties.

Internal midsole 110 (110A, 110B) may comprise any suitable material(s) configured to return energy to a wearer during takeoff, such as PU, EVA, PEBA, PEBAX, Mucell, and/or any materials having high spring coefficient and low damping coefficient. External midsole 120 (120A, 120B) may comprise any suitable material(s) configured to absorb impacts associated with running and/or walking, such as PU, EVA, and/or any materials having low spring coefficient and high damping coefficient.

In some examples, shoe 150 (150A, 150B) includes a sockliner 156 disposed above and resting on a top surface 114 of the internal midsole. The sockliner may comprise PU, EVA, and/or any other suitable material selected to provide cushion within the shoe. The sockliner may be uncoupled with respect to the internal midsole and may "float" freely within sock 154 (154A, 154B) of the shoe.

In some examples, shoe 150 (150A, 150B) includes an outsole 158 (158A, 158B) bonded to a bottom surface 124 of the external midsole. Outsole 158 (158A, 158B) may comprise any material selected to be durable and provide traction, such as rubber, thermoplastic elastomer, and/or the like. The outsole may include a tread pattern formed by a plurality of lugs or extruded portions extending outward from a bottom surface of the outsole. In some embodiments, the shoe does not include an outsole and the external midsole includes a plurality of lugs forming a tread pattern. In some examples, the outsole is included only at parts of ground-contacting surfaces of the shoe and both the outsole and the external midsole include lugs forming a tread pattern.

In some examples, shoe 150 (150A, 150B) includes a plurality of sipes or cuts extending through a heel portion of the shoe, providing enhanced flexibility within the heel portion of the shoe.

Figure 5:
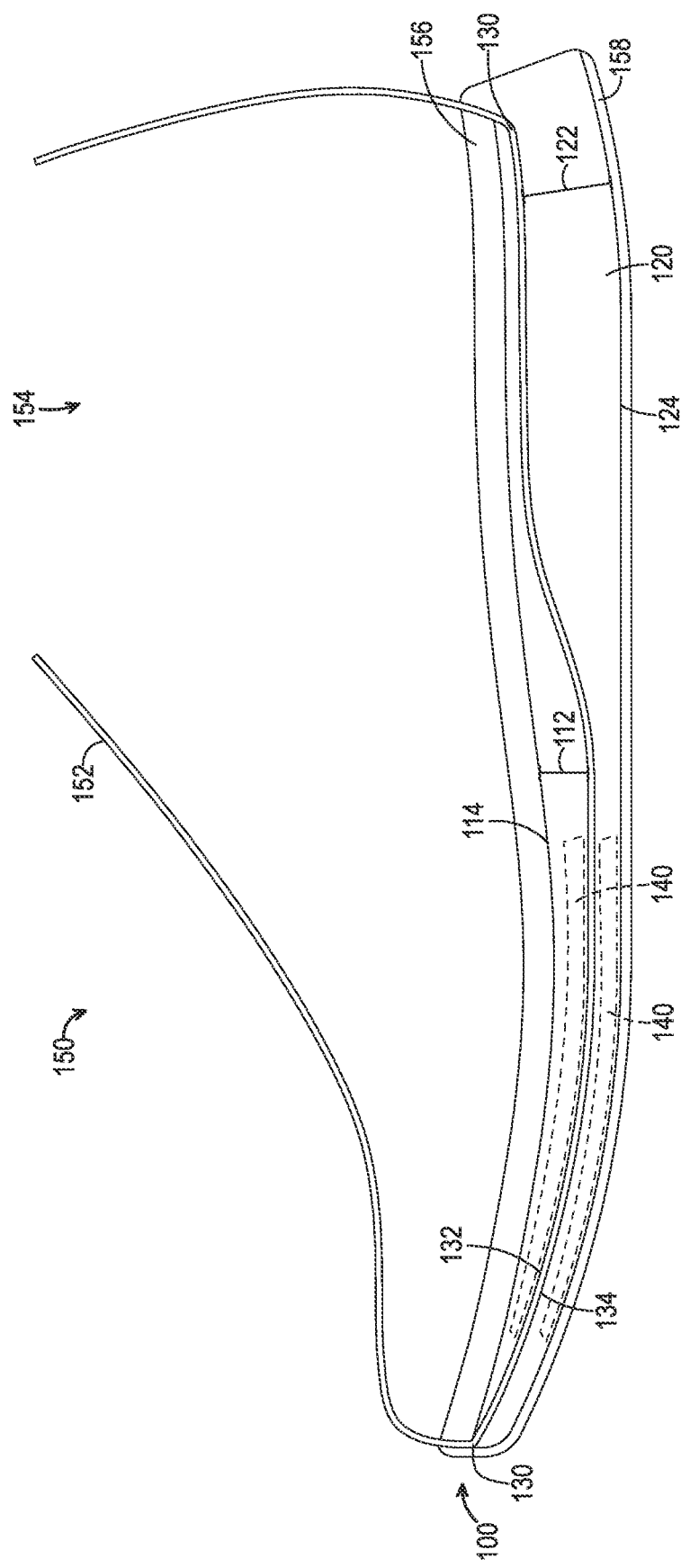
FIG. 5 is a schematic diagram of the illustrative shoe and midsole of FIG. 1 including supporting plates.
Figure 6:
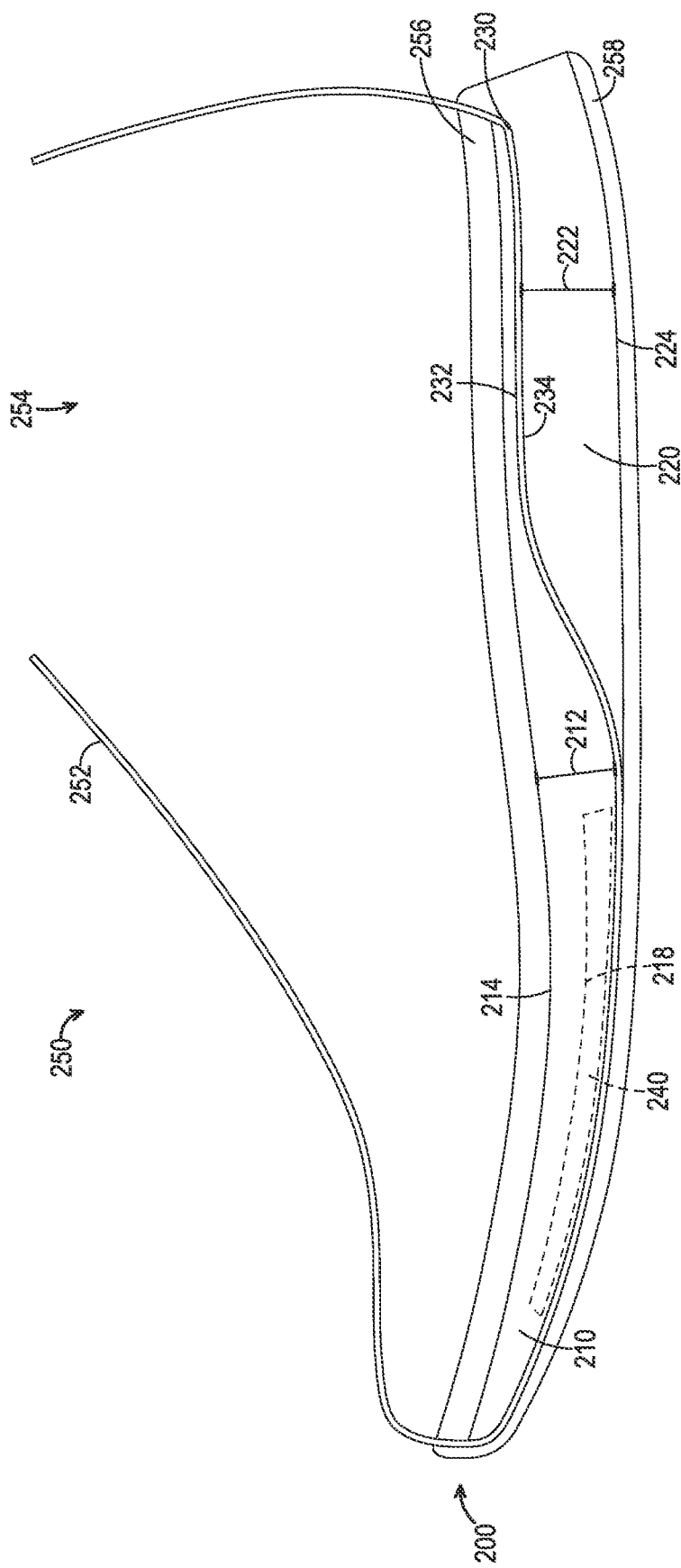
FIG. 6 is a schematic diagram of an illustrative shoe including a second illustrative dual-layered midsole.
Figure 7:
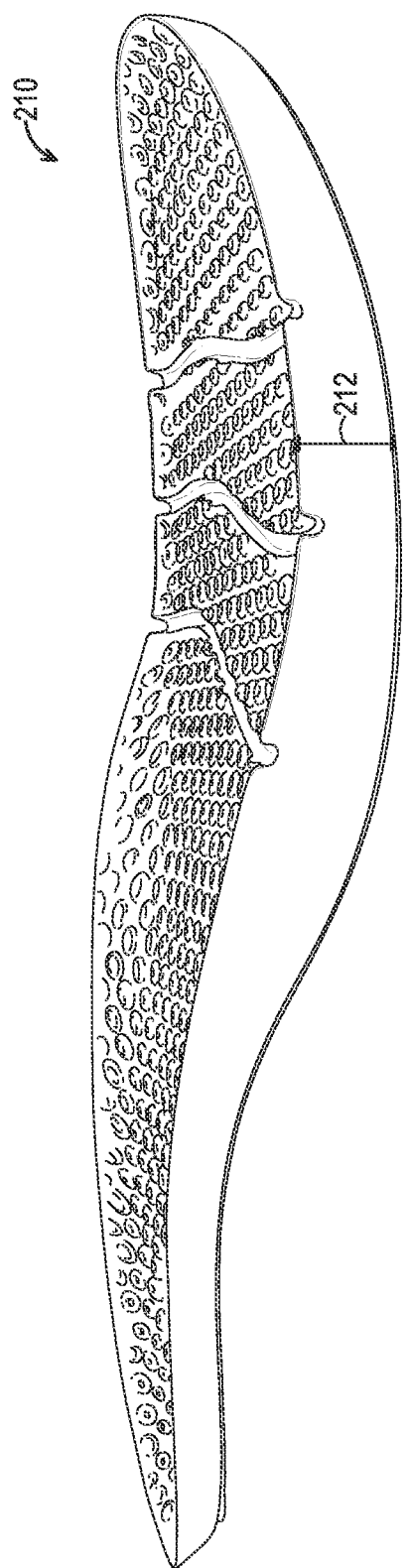
FIG. 7 is an isometric view of an illustrative interior insole layer for inclusion within the second illustrative midsole of FIG. 6.
Figure 8:
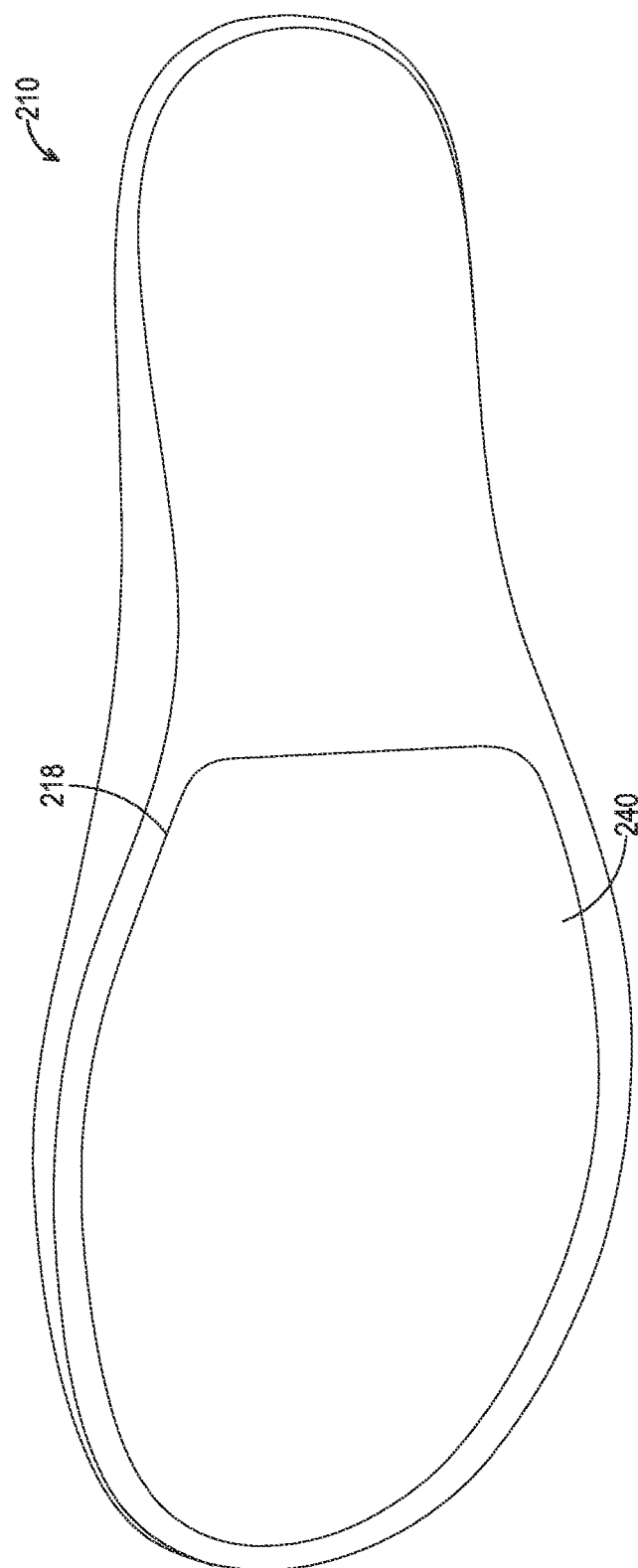
FIG. 8 is a bottom view of an illustrative interior insole including a carbon fiber supporting plate for inclusion within the second illustrative midsole of FIG. 6.
Figure 9:
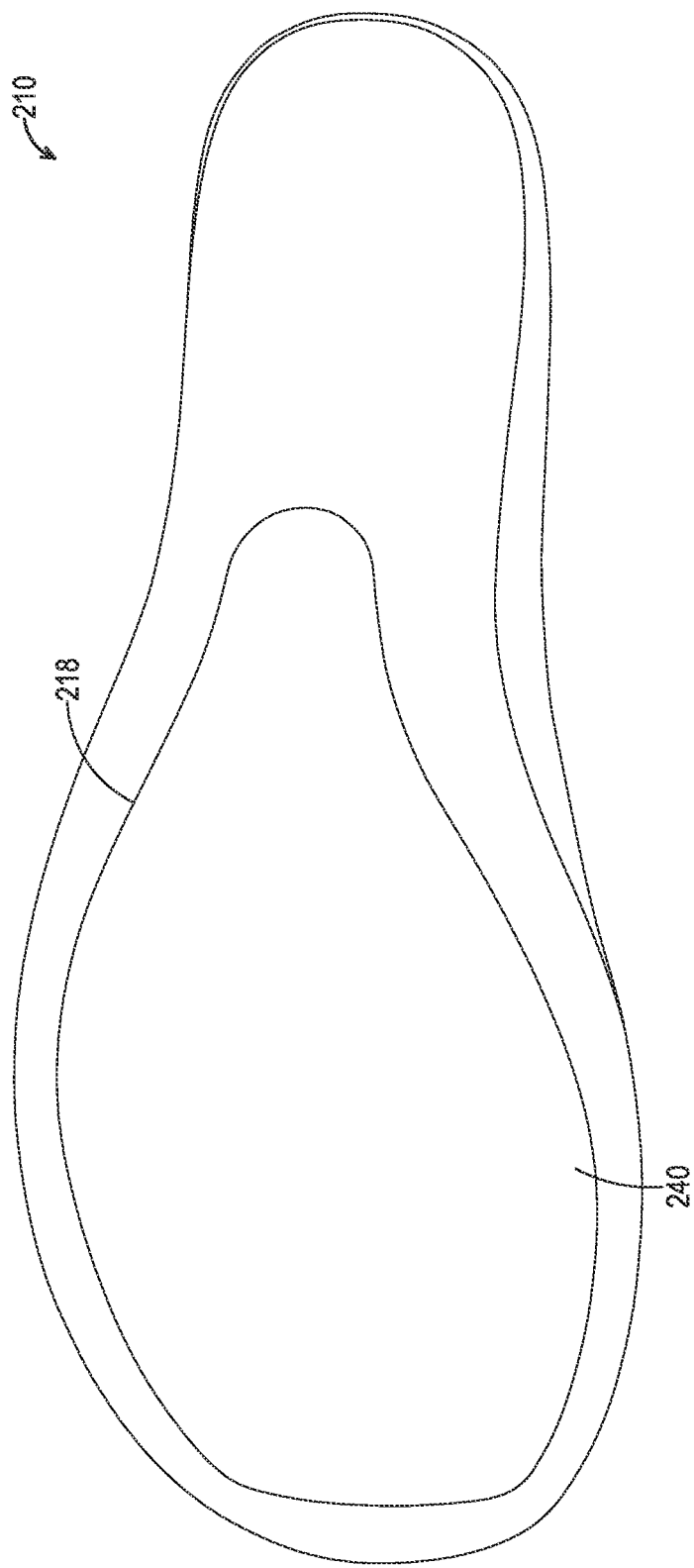
FIG. 9 is a bottom view of an illustrative interior insole including a nylon supporting plate for inclusion within the second illustrative midsole of FIG. 6.

In some examples, as depicted in FIG. 5, internal midsole 110 and/or external midsole 120 include a supporting plate 140. In some examples, supporting plate 140 is received within a complementary recess disposed within internal midsole 110 and/or external midsole 120. In some examples, supporting plate 140 and the complementary recess are disposed on an underside of internal midsole 110. In some examples, supporting plate 140 and the complementary recess are disposed on a top side of external midsole 120. In some examples, the internal or external midsole is overmolded onto the supporting plate, creating the recess in the process. Supporting plate 140 is configured to provide increased support to a wearer, and may be configured to be rigid or flexible depending on desired characteristics of the midsole. In some examples, supporting plate 140 comprises carbon fiber and/or other rigid materials. In some examples, supporting plate 140 comprises nylon and/or other flexible materials. Plate 140 may include a variety of shapes and materials configured to tune various support and flexibility characteristics of midsole 100. In some examples, supporting plate 14 is shaped as leaf spring plate. Supporting plate 140 may have any suitable shape for supporting a foot of a wearer, such as round, oblong, substantially rectangular, and/or the like. In some examples, supporting plate 140 is not included within the midsole, and is instead disposed between Strobel board 130 and outsole 158. In some examples, supporting plate 140 is disposed between Strobel board 130 and internal midsole 110. In some examples, supporting plate 140 is disposed between Strobel board 130 and external midsole 120.

B. Second Illustrative Midsole

As shown in FIGS. 6-9, this section describes a second illustrative dual-layered midsole 200, which is an example of the midsoles described in the Overview above. Midsole 200 includes an internal midsole layer (AKA first midsole layer) 210 and an external midsole layer (AKA second midsole layer) 220, which are coupled to and separated by a Strobel board 230. Internal midsole layer 210 includes an integrated plate 240, which is set into a recess within internal midsole layer 210 Midsole 200 is configured to be included in a shoe or other article of footwear 250. The shoe includes an upper 252, which may be attached at lower edges to Strobel board 230 of the midsole by any suitable method for attaching two flexible components, such as bonding, sewing, and/or the like. Upper 252 and Strobel board 230 collectively define a foot compartment, or "sock" 254, configured to contain the foot of a wearer. The internal midsole layer is disposed within the sock, and is removably coupled to a top surface 232 of the Strobel board (e.g. with adhesive), so as to be easily replaced or removed. External midsole 220 is bonded or otherwise coupled to a bottom surface 234 of the Strobel board using any suitable method for permanently coupling two components, such as mechanical bonding methods, chemical bonding methods (e.g. adhesive), and/or the like. External midsole 220 is bonded or otherwise coupled to Strobel board 230, e.g., along the entire length of the Strobel board or at parts of the Strobel board. Strobel board 230 may comprise any suitable flexible material, such as fabric, polymer (e.g., EVA, nylon, etc.), fiberboard, and/or the like.

An internal midsole thickness 212 and an external midsole thickness 222 may each vary along the length of the midsole. In this example, internal midsole thickness 212 is greatest in a forefoot region (see FIG. 7), and external midsole thickness 222 is greatest in a heel region. In some embodiments, the internal midsole layer and the external midsole layer each extends an entire length of the Strobel board. In some embodiments, the internal midsole forms the entire midsole body in the forefoot region of the shoe, extending between the wearer's foot and the ground-contacting surface. In this embodiment, Strobel board 230 may form a ground-contacting surface of the shoe, and may include lugs forming a tread pattern. In this embodiment, Strobel board 230 may be coupled to an outsole 258 at bottom surfaces of the Strobel board. The external midsole extends only partway along the length of the midsole, and may extend only from the heel of the midsole through the arch of the midsole.

Internal and external midsole materials may be selected to provide material properties specific to the desired function of the internal and external midsole, such as spring coefficient, damping coefficient, and/or any other desired viscoelastic properties. Internal midsole 210 may comprise any suitable material(s) configured to return energy to a wearer during takeoff, such as PU, EVA, PEBA, PEBAX, Mucell, and/or any materials having high spring coefficient and low damping coefficient. External midsole 220 may comprise any suitable material(s) configured to absorb impacts associated with running and/or walking, such as PU, EVA, and/or any materials having low spring coefficient and high damping coefficient.

In some examples, internal midsole 210 includes a supporting plate 240, received within a complementary recess 218 disposed within internal midsole 210. In some examples, supporting plate 240 and complementary recess 218 are disposed on an underside of internal midsole 210. Supporting plate 240 may be rigid or flexible depending on desired characteristics of the midsole. In some examples, supporting plate 240 comprises a material that is less flexible than internal midsole 210. In some embodiments, supporting plate 240 comprises carbon fiber and/or other rigid materials. In these embodiments, supporting plate 240 is disposed beneath the forefoot of a wearer (see FIG. 8). In some embodiments, supporting plate 240 comprises nylon and/or other flexible materials. In these embodiments, supporting plate 240 is disposed beneath the forefoot and arch of a wearer, functioning as a flexible shank for the shoe (see FIG. 9). Supporting plate 240 may include a variety of shapes and materials configured to tune various support and flexibility characteristics of midsole 200. In some examples, supporting plate 240 is not included within the midsole, but is instead included between the external midsole and the Strobel board. In some examples, supporting plate 240 is included between the internal midsole and the Strobel board.

In some embodiments, shoe 250 includes a sockliner 256 disposed above and resting on a top surface 214 of the internal midsole. The sockliner may comprise PU, EVA, and/or any other suitable material selected to provide cushion within the shoe. The sockliner is uncoupled with respect to the internal midsole and may "float" freely within sock 254 of the shoe.

In some examples, shoe 250 includes an outsole 258 bonded to a bottom surface 224 of the external midsole and/or a bottom surface 234 of the Strobel board. The outsole may comprise rubber, thermoplastic elastomer, and/or any other suitable material selected to be durable and provide traction. A tread pattern may be formed on the outsole by a plurality of lugs or extruded portions extending outwards from a bottom surface of the outsole. In some examples, the shoe does not include an outsole and the external midsole and/or Strobel board include a plurality of lugs forming a tread pattern. In some examples, the outsole is included only at parts of ground-contacting surfaces of the shoe and the outsole, the external midsole, and the Strobel board include lugs forming a tread pattern.

In some examples, shoe 250 may include a plurality of sipes or cuts extending through a heel portion of the shoe, providing enhanced flexibility within the heel portion of the shoe.

The following reference numerals are utilized in the accompanying drawings:
100, 110A, 110B first illustrative midsole
110, 110A, 110B first internal midsole
112 first internal midsole thickness
114 top surface of first internal midsole
120, 120A, 120B first external midsole
122 first external midsole thickness
124 bottom surface of first external midsole
130 first Strobel board
132 top surface of first Strobel board
134 bottom surface of first Strobel board
140 first supporting plate
150, 150A, 150B first shoe, first article of footwear
152, 152A, 152B first upper
154, 154A, 154B first sock
156 first sockliner
158, 158A, 158B first outsole
200 second illustrative midsole
210 second internal midsole
212 second internal midsole thickness
214 top surface of second internal midsole
218 complementary recess
220 second external midsole
222 second external midsole thickness
224 bottom surface of second external midsole
230 second Strobel board
232 top surface of second Strobel board
234 bottom surface of second Strobel board
240 second supporting plate
250 second shoe
252 second upper
254 second sock
256 second sockliner
258 second outsole
300 last C. Illustrative Method of Manufacture This section describes steps of an illustrative method 1000 for manufacturing dual-layered midsoles; see FIG. 10. Aspects of illustrative midsoles already described may be utilized in the method steps described below. Where appropriate, reference may be made to components and systems that may be used in carrying out each step. These references are for illustration, and are not intended to limit the possible ways of carrying out any particular step of the method.

Figure 10:
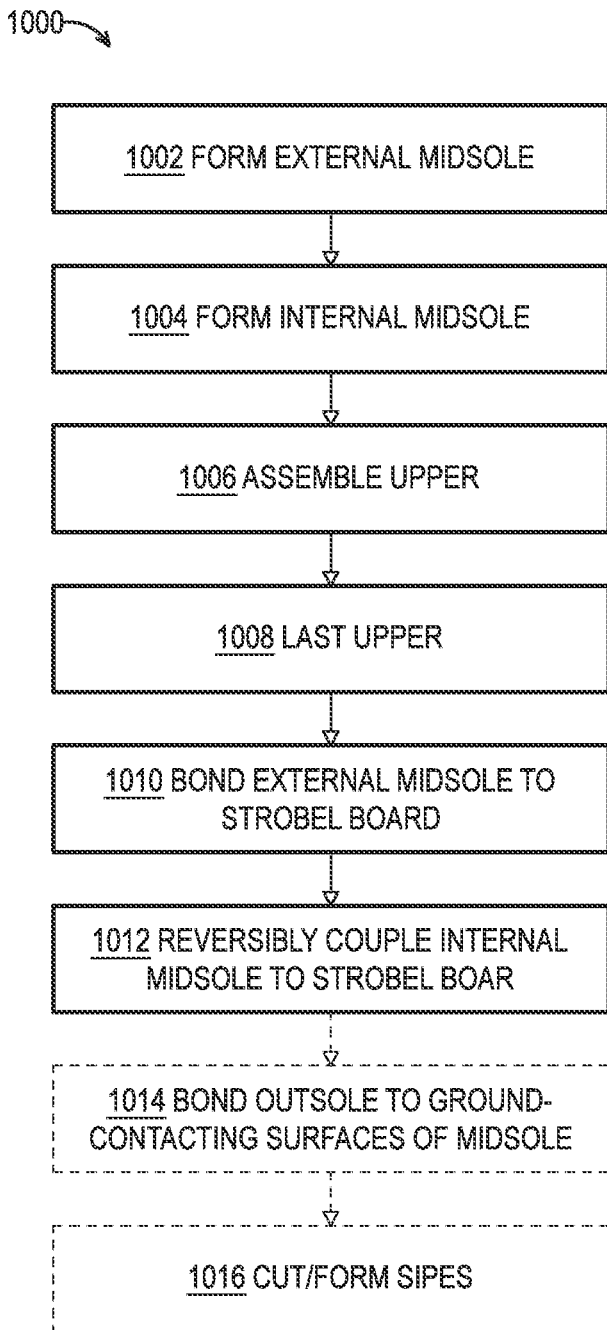
FIG. 10 is a flow chart depicting steps of an illustrative method for manufacturing a shoe including a dual-layered midsole according to the present teachings.

FIG. 10 is a flowchart illustrating steps performed in an illustrative method, and may not recite the complete process or all steps of the method. Although various steps of method 1000 are described below and depicted in FIG. 10, the steps need not necessarily all be performed, and in some cases may be performed simultaneously or in a different order than the order shown.

Step 1002 of method 1000 includes forming an external midsole configured to mate with a complementary internal midsole to form a midsole assembly. The external midsole, when paired with the complementary internal midsole, produces a midsole assembly having increased energy absorbing properties at a heel region and having increased support for a wearer during take-off at a forefoot region. The external midsole may have a length equal to or less than the desired length of the midsole assembly, and may have a varied thickness along its length. The external midsole produces a complete midsole assembly when paired with an internal midsole, and the internal midsole is configured to cushion and support areas of the foot not cushioned or supported by the external midsole. Forming the external midsole in step 1002 may include thermoforming, blowing, injection molding, 3D printing, and/or otherwise manufacturing the component using materials such as PU, EVA, and/or any other suitable materials for footwear midsoles. The external midsole may be configured to absorb impact associated with a running or walking motion, and may therefore be configured to have a high damping coefficient and a low spring coefficient. In some embodiments, forming the external midsole includes adding lugs forming a tread pattern to a bottom surface of the external midsole. This may be performed by adding lugs to a mold used in methods described above, or by using additive (e.g. gluing preformed lugs) or subtractive (e.g. cutting, grinding) methods to add lugs to a previously formed external midsole. In some examples, forming an external midsole includes integrating a supportive plate into a top surface of the external midsole (e.g., by overmolding and/or forming a recess in the external midsole and receiving the supportive plate within the recess).

Step 1004 of method 1000 includes forming an internal midsole configured to mate with the complementary external midsole to form the midsole assembly. The internal midsole may have varied thicknesses along its length, and have a length less than or equal to a length of the overall midsole assembly. The internal midsole produces a complete midsole assembly when paired with the external midsole described above. Forming the internal midsole may include thermoforming, blowing, injection molding, 3D printing, and/or otherwise manufacturing the component using materials such as PU, PEVA, PEBA, PEBAX, Mucell, and/or any other suitable materials for footwear midsoles. The internal midsole may be formed to provide support during a "takeoff" motion associated with running, walking, and/or other forms of movement, and may therefore be configured to have a high spring coefficient and a low damping coefficient. In some examples, forming an internal midsole includes integrating a supportive plate into the internal midsole (e.g., by overmolding and/or forming a recess in the internal midsole and receiving the supportive plate within the recess).

Steps 1002, and 1004 may be carried out in any order, may be carried out simultaneously, and may be completed substantially in advance of subsequent steps.

Step 1006 of method 1000 includes assembling an upper. The upper may be assembled (e.g., sewn together) from any of a variety of suitable materials for an athletic shoe, such as natural fabrics, synthetic fabrics, plastics, leather, and/or the like. Assembling the upper may include coupling (e.g., sewing or gluing) the upper to a Strobel board to form a sock of the shoe.

In some examples, the Strobel board comprises a substantially flat piece of flexible, relatively inelastic material, such as fabric, polymer (e.g., EVA, nylon, etc.), fiberboard, and/or the like configured to provide a barrier between the internal and external midsoles described above. The Strobel board may be cut, machined, or otherwise shaped to obtain its final form. In some examples, the Strobel board comprises a foam and may be manufactured using any suitable technique for working with polymers and/or foams, such as thermoforming, blowing, injection molding, 3D printing, and/or the like. In some examples, the Strobel board functions as a ground-contacting surface, and may include a tread pattern (e.g., lugs forming a tread pattern). In some examples, manufacturing the Strobel board includes adding a tread pattern to a bottom surface of the Strobel board. This may be performed by adding lugs to a mold used in methods described above, or by using additive (e.g. gluing preformed lugs) or subtractive (e.g. cutting, grinding) methods to add lugs to a previously formed Strobel board. A Strobel board may also be obtained (pre-made) from a manufacturer.

Step 1008 of method 1000 includes lasting the upper. Lasting the upper may include placing the finished Strobel sock on a last having a volume approximately equal to the sum of the volume of the human foot and the volume of the internal midsole. The upper is caused to take on the shape of the last, using steam heating or otherwise providing heat to the upper.

An illustrative last 300 suitable for use in step 1008 is depicted in FIG. 11. As the internal midsole is configured to be disposed in a foot compartment or "sock" defined by the upper and the Strobel board, a last (e.g., last 300) used for the construction of the shoe has a size greater than the size of a typical last. As shown in FIG. 11, a foot portion 302 of last 300 forms a top portion of the last. A midsole portion 304 forms a bottom portion of the last. As internal midsoles may have varying sizes, the design of the last is based on the size of the shoe and the specific internal midsole used within the shoe. Last 300 forms a lasted upper configured to receive an internal midsole having a greater thickness at the forefoot of the midsole than at the heel of the midsole. Uppers lasted using last 300 are suitable for use in shoes having relatively thick internal midsoles (e.g., shoe 200).

The last may be manufactured by cutting, sculpting, machining, injection molding, 3D printing, or otherwise manufacturing a last using rigid materials such as wood, metal, heat-resistant plastic, and/or the like. In some examples, a last for a shoe may be formed as a single piece based on the combined volume of the human foot and an internal midsole to be received within the lasted upper of the shoe. In some examples, a last may be manufactured by bonding (e.g., gluing, adhering, welding, etc.) a rigid last extension having the general shape and volume of an internal midsole to a last having the general shape and size of a human foot.

Step 1010 of method 1000 includes bonding the external midsole to a bottom surface of the Strobel board. Bonding the external midsole to the Strobel board may include using adhesive, mechanical attachment methods, heat, and/or other methods used to permanently bond two polymers or foams. In some examples, bonding the external midsole to the Strobel board further includes pressing the two components to compress the foam used in the midsole and solidify the bonding agents. In some examples, bonding the external midsole to the Strobel board includes sandwiching a supportive plate between the external midsole and the Strobel board and bonding the plate to both the Strobel board and the external midsole.

Step 1012 of method 1000 includes removably coupling the internal midsole to a top surface of the Strobel board. Because the Strobel board is lasted with the upper to form the sock of the shoe, coupling the internal midsole to a top surface of the Strobel board may include inserting the internal midsole into the lasted sock of the shoe. Removably coupling the internal midsole to the Strobel board within the sock of the shoe forms an internal foot cavity configured to receive and support a human foot. Removably coupling the internal midsole to the Strobel board may include tacking (e.g. loosely sewing), gluing, or other easily releasable methods. In some examples, this step may be omitted and the internal midsole may be free of the Strobel.

In some examples, method 1000 includes an optional step 1014, which includes coupling (e.g., bonding) an outsole to a lower surface of the finished midsole. The outsole may comprise rubber, thermoplastic elastomer, and/or any material selected to be durable and provide traction. The outsole may include a plurality of lugs or extruded portions extending outward from a bottom surface of the outsole, forming a tread pattern. Coupling the outsole to the midsole may include using adhesive, mechanical attachment methods, heat, and/or any suitable alternative attachment methods to permanently attach the components.

In some examples, method 1000 includes an optional step 1016, which includes cutting or otherwise forming sipes or grooves into a heel or other region of the sole. Sipes may be added using a saw, knife, and/or any other suitable cutting implement. Cutting may be controlled automatically or semi-automatically using computer systems, such as computed numeric control (CNC) methods, or may be hand controlled. In some examples, sipes or grooves are added in an injection molding process. In some examples, sipes or grooves are added to the sole during previously-describes steps, such as when the external midsole is injection-molded, or being formed into the outsole before the outsole is bonded to the midsole.

D. Illustrative Combinations and Additional Examples

This section describes additional aspects and features of dual-layered midsoles, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An article of footwear comprising:
    a sole including:
    a first midsole layer extending from a forefoot region to a heel region of the sole;
    a second midsole layer disposed below the first midsole layer; and
    a Strobel board disposed between the first and the second midsole layers.

A1. The article of footwear of A0, wherein the Strobel board is in contact with the first midsole layer and the second midsole layer.

A2. The article of footwear of A0 or A1, further comprising an upper coupled to the Strobel board, e.g., by sewing or adhesive.

A3. The article of footwear of A2, wherein the Strobel board and the upper collectively define a sock portion of the article of footwear, such that the first midsole layer is internal to the sock portion and the second midsole layer is external to the sock portion.

A4. The article of footwear of any one of paragraphs A0 through A3, wherein the second midsole layer extends under only the heel region of the first midsole layer.

A5. The article of footwear of any one of paragraphs A0 through A4, further comprising a plate disposed on an underside of the first midsole layer, the plate comprising a material having a lower flexibility than the first midsole layer.

A6. The article of footwear of A5, wherein the plate is disposed in a complementary recess of the first midsole layer.

A7. The article of footwear of any one of paragraphs A0 through A6, further comprising a sockliner disposed on a surface of the first midsole layer opposite the Strobel board.

A8. The article of footwear of any one of paragraphs A0 through A7, further comprising an outsole disposed under the first and second midsole layers.

A9. The article of footwear of any one of paragraphs A0 through A8, further comprising a plate disposed on a top side of the second midsole.

A10. The article of footwear of any one of paragraphs A0 through A3 and A5 through A9, wherein the first midsole layer and the second midsole layer each extends along an entire length of the Strobel board.

B0. An article of footwear comprising:
a Strobel board; and
a sole including a first midsole layer extending from a forefoot region to a heel region of the sole and coupled to a top surface of the Strobel board, and a second midsole layer coupled to a bottom surface of the Strobel board.

B1. The article of footwear of B0, wherein the first midsole layer has a first midsole thickness which varies along a length of the sole, wherein the second midsole layer has a second midsole thickness which varies along a length of the sole, wherein the first midsole thickness is greatest in the forefoot region, and wherein the second midsole thickness is greatest in the heel region.

B2. The article of footwear of B0 or B1, further comprising an upper coupled to the Strobel board.

B3. The article of footwear of B2, wherein the Strobel board and the upper define a sock of the article of footwear, such that the first midsole layer is internal to the sock and the second midsole layer is external to the sock.

B4. The article of footwear of any one of paragraphs B0 through B3, further comprising a sockliner disposed on the first midsole layer.

B5. The article of footwear of any one of paragraphs B0 through B4, further comprising an outsole disposed under the first and second midsole layers.

B6. The article of footwear of any one of paragraphs B0 through B5, wherein the first midsole layer and the second midsole layer each extends along an entire length of the Strobel board.

C0. An article of footwear comprising:
a sole including:
a first (i.e., internal) midsole layer extending from a forefoot region to a heel region of the sole;
a second (i.e., external) midsole layer disposed below the first midsole layer;
a Strobel board disposed between the first and second midsole layers;
an upper coupled to the Strobel board;
wherein the Strobel board and the upper define a sock of the article of footwear, such that the first midsole layer is internal to the sock and the second midsole layer is external to the sock.

C1. The article of footwear of C0, wherein the second midsole layer extends under only the heel region of the first midsole layer.

C2. The article of footwear of C0 or C1, wherein the second midsole layer extends under only the forefoot region of the first midsole layer.

C3. The article of footwear of any one of paragraphs C0 through C2, further comprising a plate disposed on an underside of the first midsole layer, the plate comprising a material that is less flexible than the first midsole layer.

C4. The article of footwear of C3, wherein the plate comprises nylon.

C5. The article of footwear of C3, wherein the plate comprises carbon fiber.

C6. The article of footwear of any one of paragraphs C0 through C5, further comprising a sockliner disposed on the first midsole layer.

C7. The article of footwear of any one of paragraphs C0 through C6, further comprising an outsole under the first and second midsole layers.

C8. The article of footwear of any one of paragraphs C0 through C7, wherein the first midsole is removably coupled to the Strobel board.

D0. A method of manufacturing a dual-layered midsole, the method comprising:
coupling a first midsole layer to a bottom surface of a Strobel board; and
coupling a second midsole layer to a top surface of the Strobel board.

D1. The method of D0, wherein the first midsole layer is configured to have a high damping coefficient and a low spring coefficient.

D2. The method of D0 or D1, wherein the second midsole layer is configured to have a low damping coefficient and a high spring coefficient.

D3. The method of D0, D1, or D2, further including assembling an upper by coupling an upper to the Strobel board to form a sock of a shoe.

D4. The method of D3, further including lasting the upper by placing the sock of the shoe on a last and causing the upper to take the shape of the last using heat.

D5. The method of claim D4, wherein a volume of the last includes a volume approximating the second midsole layer.

Advantages, Features, and Benefits

The different embodiments and examples of the dual-layered midsole described herein provide several advantages over known midsoles for footwear. For example, illustrative embodiments and examples described herein allow the volume of a sock of a shoe including the midsole to change as the volume of a wearer's foot changes during normal foot movement. The internal midsole may compress and expand with the movement of a wearer, allowing the shoe to conform to the foot of a wearer as they move.

Additionally, and among other benefits, illustrative embodiments and examples described herein allow for tuning of damping coefficients, spring coefficients, and other properties which affect energy transfer rate within a shoe.

Additionally, and among other benefits, illustrative embodiments and examples described herein allow for shoes including the midsole to be recyclable. Shoes including an internal midsole which is removably coupled to the remainder of the shoe may be recycled, as components including different types of foam materials may be separated.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An article of footwear comprising:
    a sole including:
        a first midsole layer extending from a forefoot region to a heel region of the sole;
        a second midsole layer disposed below the first midsole layer; and
        a Strobel board disposed between the first midsole layer and an outsole in the forefoot region and between the first and the second midsole layers in the heel region, wherein the Strobel board is disposed directly above the outsole in the forefoot region;
        wherein a full extent of the second midsole layer extends under only the heel region of the first midsole layer.

2. The article of footwear of claim 1, wherein the Strobel board is in contact with the first midsole layer and the second midsole layer.

3. The article of footwear of claim 1, further comprising an upper coupled to the Strobel board, such that the upper and the Strobel board collectively define a sock portion of the article of footwear.

4. The article of footwear of claim 3, wherein the first midsole layer is internal to the sock portion and removably coupled to a top surface of the Strobel board.

5. The article of footwear of claim 1, further comprising a plate disposed on an underside of the first midsole layer, the plate comprising a material having a lower flexibility than the first midsole layer.

6. The article of footwear of claim 5, wherein the plate is disposed in a complementary recess of the first midsole layer.

7. The article of footwear of claim 1, further comprising a sockliner disposed on a surface of the first midsole layer opposite the Strobel board.

8. The article of footwear of claim 1, wherein the outsole extends from the forefoot region to the heel region.

9. The article of footwear of claim 1, wherein the first midsole layer is coupled directly to a top surface of the Strobel board, and the second midsole layer is coupled directly to a bottom surface of the Strobel board.

10. The article of footwear of claim 1, wherein the first midsole layer has a first midsole thickness which varies along a length of the sole, and wherein the first midsole thickness is greatest in the forefoot region.

11. The article of footwear of claim 9, further comprising an upper coupled to the Strobel board, such that the upper and the Strobel board collectively define a sock of the article of footwear.

12. The article of footwear of claim 11, wherein the first midsole layer is disposed within the sock and in direct contact with a top surface of the Strobel board.

13. The article of footwear of claim 9, further comprising a sockliner disposed on the first midsole layer.

14. The article of footwear of claim 9, wherein the outsole extends from the forefoot region to the heel region.

* * * * *